United States Patent [19]

Superina et al.

[11] Patent Number: 5,048,528
[45] Date of Patent: Sep. 17, 1991

[54] ALIAS SUPPRESSION IN PULSED DOPPLER SYSTEMS

[75] Inventors: Laura Superina, Westminster; Casper W. Barnes, Irvine, both of Calif.

[73] Assignee: North American Philips Corp., New York, N.Y.

[21] Appl. No.: 614,351

[22] Filed: Nov. 15, 1990

[51] Int. Cl.⁵ .............................................. A61B 8/00
[52] U.S. Cl. ............................. 128/661.09; 73/861.25
[58] Field of Search ....................... 128/661.09, 660.05, 128/661.07; 73/861.25

[56] References Cited

U.S. PATENT DOCUMENTS

| | | | |
|---|---|---|---|
| 4,607,642 | 8/1986 | Powers | 128/661.09 |
| 4,930,513 | 6/1990 | Mayo et al. | 128/661.09 |
| 4,930,514 | 6/1990 | Baba et al. | 128/661.09 |
| 4,955,386 | 9/1990 | Nishiyama et al. | 128/661.09 |
| 4,993,417 | 2/1991 | Seo | 128/661.09 |

Primary Examiner—Francis Jaworski
Assistant Examiner—George Manuel
Attorney, Agent, or Firm—Jack E. Haken

[57] ABSTRACT

A Doppler velocity spectrum produced by radial projection in a two-dimensional Fourier frequency domain is processed to suppress alias spectral terms. The projected spectrum is divided into windows using an iterative algorithm which centers the spectral mean. The window containing data samples which maximizes a weighted score based upon the width and maximal value of samples within the window is used to determine which window contains true spectral components. Spectral components in other windows are then suppressed.

10 Claims, 5 Drawing Sheets

ALIAS SUPPRESSION IN PULSED DOPPLER SYSTEMS

The invention relates to methods and apparatus for measuring velocity by analysis of Doppler shift induced in broadband pulsed waves. The invention is particularly useful in conjunction with echo ultrasound systems which measure blood flow within a human or animal body.

BACKGROUND OF THE INVENTION

Pulsed Doppler ultrasound systems are commonly used to measure and map the velocity of blood flow within human and animal bodies. Pulses of ultrasound energy are directed into the body along a path which intersects blood vessels or a coronary chamber. Ultrasound energy from the pulses is backscattered from blood within the vessel or chamber and returns to a transducer where it is converted into an electrical signal. If the blood has a velocity component along the direction of propagation of the ultrasound waves, the frequency of the scattered echoes will be shifted, in relation to the frequency of the incident ultrasound energy. The Doppler shift which is thus induced in the echoes can be analyzed to yield a numeric estimate of the blood velocity and/or to produce a map of blood velocity as a function of position within the body.

U.S. Pat. 4,930,513 describes a system wherein the amplitude of echoes along an ultrasound A-line are sampled at discrete times at a rate which is above the Nyquist frequency. RF sample vectors at a selected range from successive A-lines, taken in the same direction through a region of the body, form a two-dimensional matrix with element positions described by a first, fast-time, variable which specifies the range of a data sample along its A-line, and a second, slow-time, variable which specifies the position of the A-line within a group of collected A-lines. The data matrix is processed with a two-dimensional discrete Fourier transform, taken with respect to the fast-time variable and the slow-time variable, which maps the data set into a discrete two-dimensional Fourier frequency space wherein constant velocity Doppler shifts appear on radial lines whose angle with respect to the vertical axis is a function of velocity. The slow-time axis corresponds to a slow-frequency (Doppler frequency) axis in the two-dimensional Fourier frequency space and the fast-time axis corresponds to a fast frequency (radio frequency) axis in the Fourier frequency space. Echoes of wideband pulses which are scattered from a moving target are mapped as generally elliptical shapes in the two-dimensional Fourier space. The angle between the major axis of an ellipse and the coordinate axes is a high quality measure of the velocity of the scattering medium. The angular distribution of the spectrum in two-dimensional Fourier frequency space (and hence velocity components in the region of the object) are estimated by computing a radial projection of the transformed data array.

The discrete Fourier transform is periodic in nature. As a result, the spectral components produced by high velocity scatterers will tend to "wrap around" unit cells in the Fourier frequency space. This is the familiar "aliasing" problem associated with a Fourier transform of any sampled signal. Thus, a typical radial projection of the two dimensional spectrum generated by pulse echoes from a moving medium will have a number of peaks at different velocities. The peak with the greatest maximum and least width generally corresponds to the true velocity spectrum of the scattering medium. The other peaks, which are alias terms, generally have smaller maxima and greater widths. Because of the random nature of ultrasound scattering from blood, an alias term may occasionally have a higher maximum or a narrower width than the true term. However, it is very unusual for an alias term to have both a higher maximum and a narrower width than the true term. Thus, a human observer of a plotted radial projection can almost always identify the term in the radial projection that corresponds to the true velocity spectrum of the scattering medium.

SUMMARY OF THE INVENTION

The invention is an apparatus and method for processing two-dimensional Fourier transform data from pulsed Doppler systems to automatically identify the true velocity components of a radial projection and suppress alias terms.

The method is based on an algorithm which uses a weighted combination of the maximum value and a width measure (such as variance) of each term in the radial projection to identify a term that corresponds to the true velocity. To do this, it is necessary to appropriately isolate each term in the radial projection so that the maximum value and width can be computed.

To compute the width of a term in the radial projection it is necessary to only use data samples in a "window" that is centered on each term and extends half way to adjacent terms on each side. If this data window is not properly centered, contributions from adjacent terms can cause significant error in the computed width.

One way to locate the windows is to center them around the peak values; unfortunately, because of the random nature of the scattering, the terms tend to be ragged and unsymmetrical. Therefore the mean of each term in the radial projection is used as a more appropriate point on which to center the window. In order to compute the mean for a term, however, it is necessary to have the window appropriately centered, otherwise the computation of the mean will be contaminated by contributions from adjacent terms.

An alternate approach is to locate the troughs between the terms for use as the window edges. This can be done by taking advantage of the periodic nature of the terms as well as the fact that the energy in each term, although distributed differently, is approximately the same. This can be accomplished by an iterative calculation that successively approximates the location of the mean of the spectrum such that the terms are evenly divided by this mean.

A preferred embodiment of the invention uses an algorithm which assumes only that there are an even number of terms in the spectrum. The locations of the terms, even when a portion of a term is located on the other side of the spectrum, does not matter. In practice, the algorithm has been found to converge very rapidly, yielding an accurate value of the mean after only a few iterations.

Initially, the mean is computed starting at a first data sample in the spectrum. If the computed mean is at the center of the spectrum, then the starting point has been found; the width and the maximum value of each term can then be computed. However, the first computed mean will often not be at the center of the spectrum because of wrap around of terms in the radial projection. In this case, the data are rotated so that the first computed mean is at the center and the mean of the rotated spectrum is recomputed. The process is repeated —compute mean, rotate data, compute mean, rotate data, etc.—until the computed mean is at the center of the data. When the computed mean is at the center of the data, then the mean has been accurately located.

Once the mean has been located, the method divides the radial projection into adjacent non-overlapping windows of the same size, one for each term, with the first window starting at the mean. Within each window the maximum and width are computed, and in turn, they are used to compute a score for each window term in the radial projection according to a function that is maximized by a large maximum and a small width, for example, the formula:

$$score = variance + \beta(maxmax - max)$$

where $\beta$ is a parameter that controls the relative weight given to max and variance and maxmax is the maximum of the entire spectrum. The window with the lowest score is taken to be the window containing the true velocity spectrum; the spectra in the other windows are assumed to be aliases and are suppressed.

BRIEF DESCRIPTION OF THE DRAWING

The invention is described with reference to the attached drawings in which.

DESCRIPTION OF THE PREFERRED EMBODIMENT

U.S. Pat. No. 4,390,513 is incorporated herein by reference.

Figure 1:
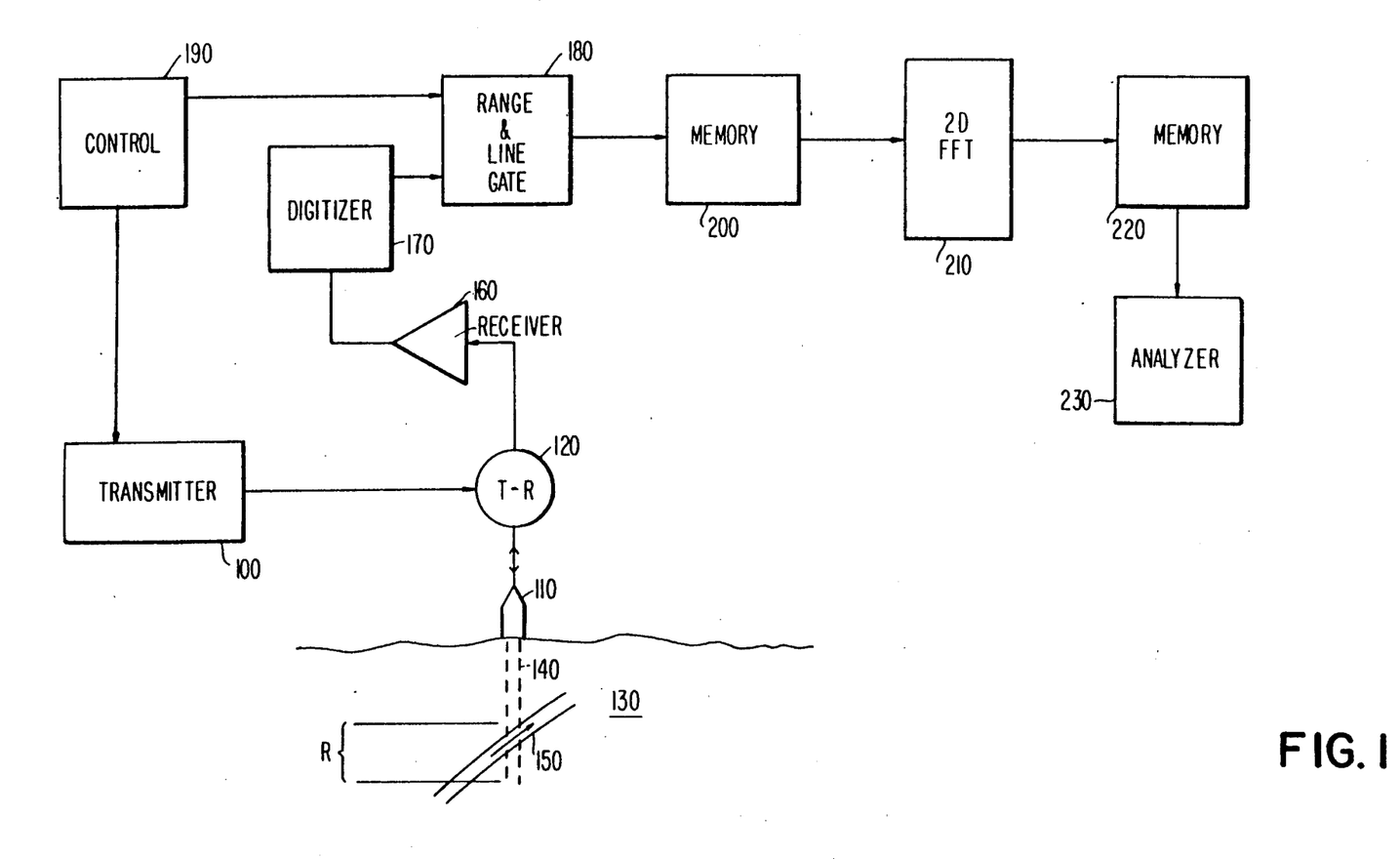
FIG. 1 is an ultrasound examination system in accordance with the invention.

FIG. 1 illustrates an ultrasound blood velocity measurement system which incorporates the invention. A transmitter 100 excites an ultrasound transducer 110 via a TR switch 120 to transmit broadband pulses of ultrasound energy into a body 130 long a narrow beam 140. The ultrasound energy in the beam is backscattered from structures in the body, for example from blood flowing in an artery 150, to produce echoes which return to and are detected by transducer 110. The frequency of the ultrasound signals scattered from structures in the body, which are moving in the direction of the axis of the beam 140 will be shifted with respect to the frequency of the ultrasound energy produced by the transducer in accordance with the Doppler equation. Echo signals produced by the transducer are coupled to a receiver 160 via the TR switch 120 and are amplified therein. The output of the receiver is connected to a radio frequency digitizer 170 which extracts and digitizes samples of the echo signals. The output of the digitizer is connected to the input of a range and line gate 180. Each transmitted RF pulse produces an A-line signal which maps range along the axis of beam 140 into signal arrival time. Control circuit 190 operates range gate 180 to select signal samples which originate within the region of the body defined by range, R, and beam 140. The digitizer 170 periodically samples the RF signal of the A-line at a rate which is at least twice the frequency of the highest component in the signal. Successive samples which lie within the range, R, along each A-line are stored as a column vector in a matrix array in memory 200. Successive A-lines are stored at successive column in the matrix so that each row of the matrix represents samples taken at corresponding ranges along successive A-lines. Individual elements stored in the matrix in memory 200 may thus be identified and addressed by a "fast-time" index, (which identifies a sample along each A-line and thus a row in the matrix) in conjunction with a "slow-time" index (which identifies the specific A-line and thus the column in the matrix).

The array stored in memory 200 is processed in a two-dimensional discrete Fourier transform processor 210 and the results are stored in a second processor 220. Depending on speed and data constraints of the system, the processor 210 may either be accomplished as a software routine in a general purpose digital computer or a microprocessor or, alternately, may be effected by dedicated fast Fourier transform processor chips.

The output of the processor 210 is an array of data elements which represent the transform of the sampled A-line data with respect to a first (slow-time) variable which identifies individual A-line vectors in a data set and a second (fast-time) variable which represents the discrete sample position along each A-line. The array in memory 220 may be interpreted as a two-dimensional frequency spectrum representation with respect to a fast frequency variable which corresponds to the RF frequency spectrum of the received echo signal and a slow-frequency variable which corresponds to the Doppler frequency components.

Figure 2:
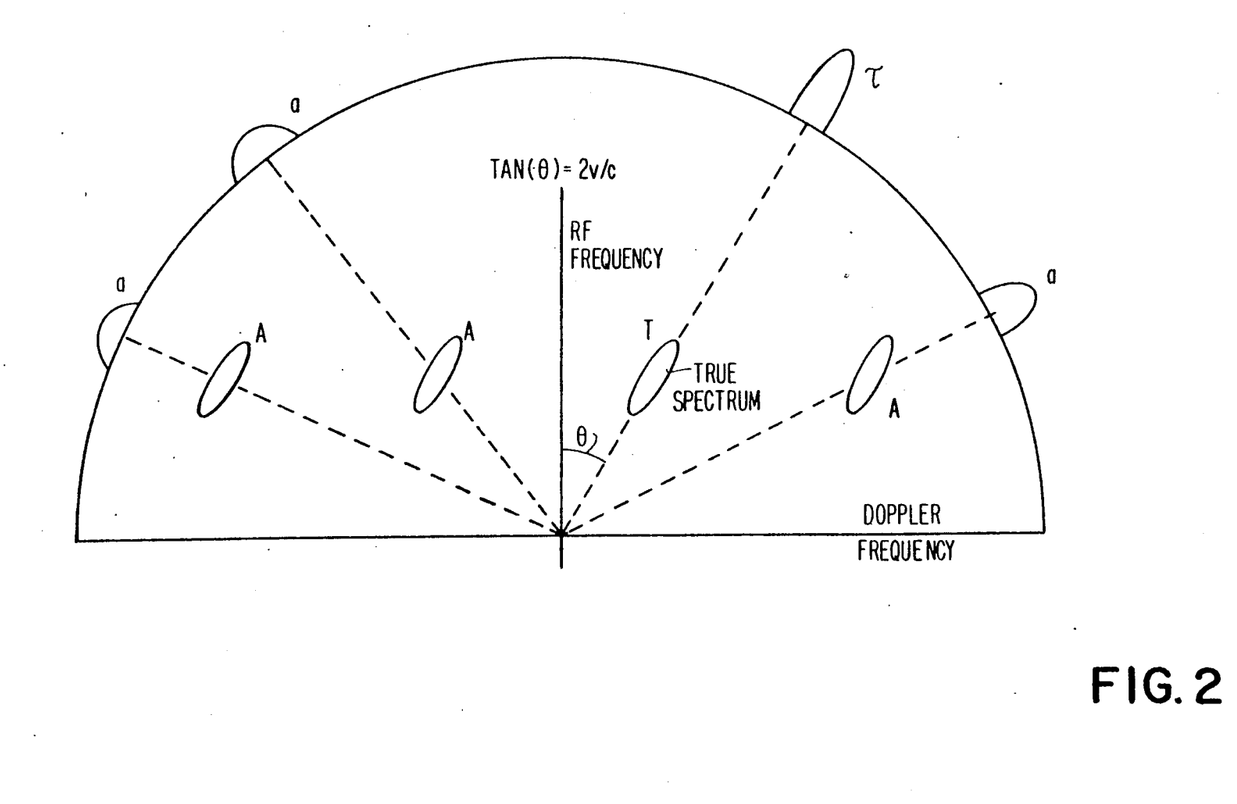
FIG. 2 illustrates the radial projection of an aliased signal in two-dimensional Fourier frequency space.

The two dimensional discrete Fourier transform data provides information about the velocity of the scattering medium in a region corresponding to the range gate R. If the medium in the range gate is moving towards the transmitter with a velocity, v, the two-dimensional discrete Fourier transform will have a generally elliptical form, T, as shown in FIG. 2. For typical parameter values the major axis of the ellipse passes through the origin of the two-dimensional frequency plane making an angle, $\theta$, with the vertical axis. The spectral data stored in memory 220 are processed in an analyzer 230 to extract velocity information. In a preferred embodiment, the velocity spectrum is determined by radial projection in the two-dimensional Fourier frequency space. The angle, $\theta$, and hence the velocity, v, is estimated by computing the radial projection of the magnitude of the two-dimensional Fourier transform as taught by U.S. Pat. No. 4,930,513.

Figure 3:
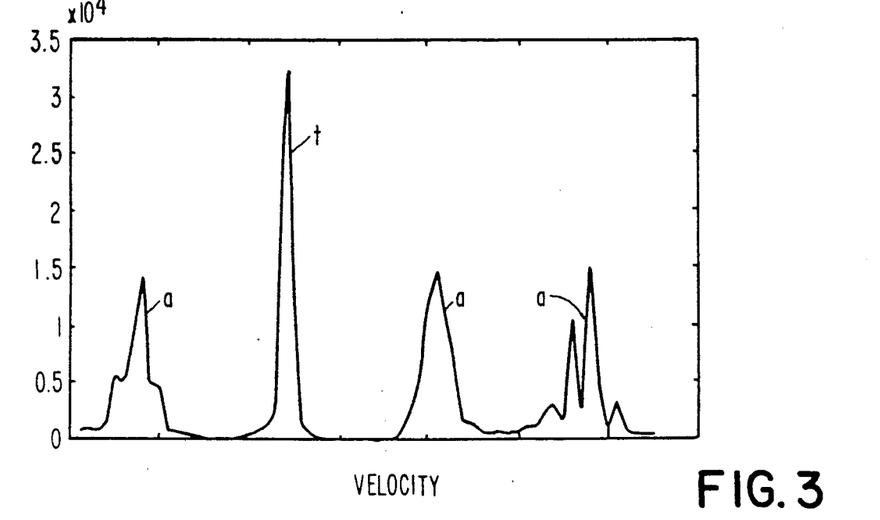
FIG. 3 is an example of a radial projection of a two-dimensional Doppler spectrum indicating blood flow velocity.
Figure 4:
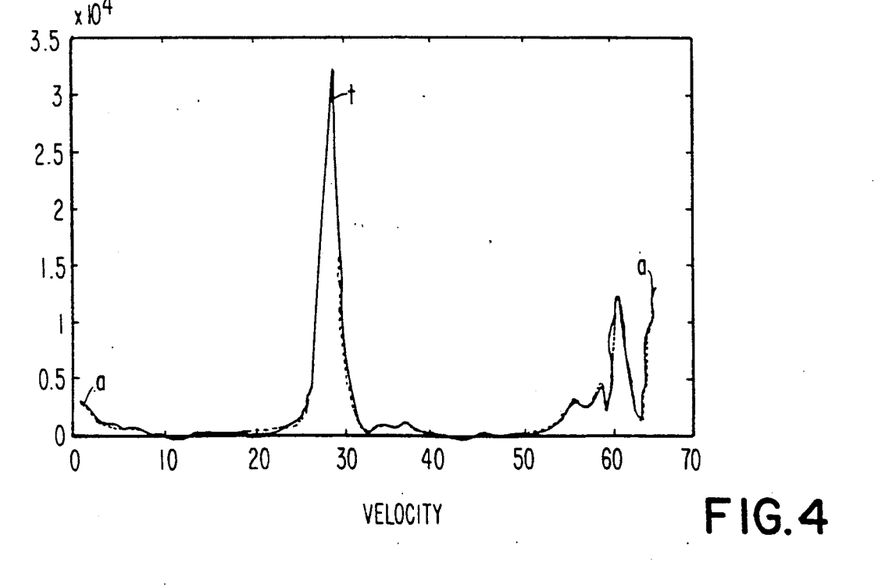
FIG. 4 is a radial projection of a two-dimensional Doppler spectrum in which part of one term has wrapped around.

If components of the velocity are sufficiently high, the two-dimensional Fourier transform data in memory 220 will include alias spectral components, A, as well as true spectral components, T (FIG. 2). In general, the radial projections, a, of the alias spectra, A, will have smaller magnitude and be wider than the radial projection, t, of the true spectrum, T. This is further illustrated in FIG. 3 which is a cartesian plot of a radial projection velocity spectrum. In a practical system, all of the alias components are not necessarily contiguous. As illustrated in FIG. 4 one of the alias components, a*, may wrap around the end of the spectrum.

In order to suppress alias spectral components, the analyzer 230 (FIG. 1) includes a program which divides the radial projection (FIG. 5) spectrum into windows, $W_1$---- $W_n$, using the troughs between terms as the window edges. This is accomplished by an iterative calculation that successively approximates the location of the mean, M, of the spectrum such that the terms are evenly divided. Initially the mean is computed starting at the first data sample in the spectrum. If the computed mean is at the center of the spectrum, then the starting point has been found. If the mean is not at the center, the spectrum is rotated so that the initially computed mean is at the center and the new mean of the rotated spectrum is calculated. The process is iterated until the mean of the rotated spectrum is at its center.

Figure 5:
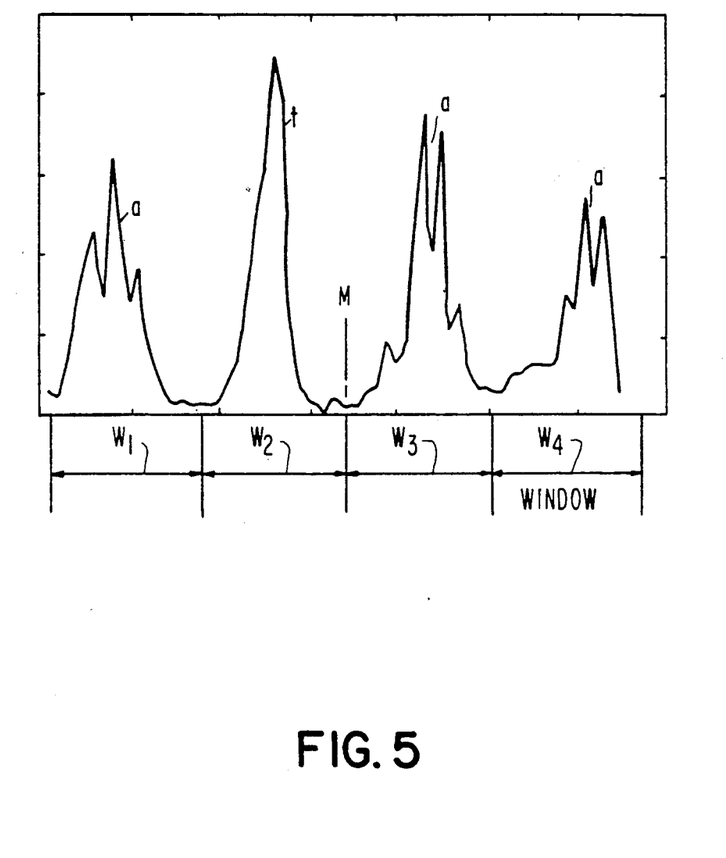
FIG. 5 is a radial projection with correctly located windows for computation of the mean and width of each spectral component.

The maximum value and width of each term can then be computed and tested to identify the true spectrum term, t, and the alias terms are suppressed.

Appendix A contains an example of a C language computer program with a module alias$_{13}$sup which implements the alias suppression techniques of the invention.

APPENDIX A

Copyright NAPC 1990

```
#include <math.h>
#include <stdlib.h>
#include <stdio.h>
#define mod(x,y)     ((x) % (y) + (((x) < 0)? (y):0))
#define round(a)     (((a) < 0) ? (int)((a)-0.5) : (int)((a)+0.5))
/*******************************************************************
MODULE NAME: ALMP

MODULE PURPOSE: PROVIDES ROUTINES FOR ALIAS SUPPRESSION

MODULE CONTENTS:

moment          calculates 0th,1st,and 2nd moments of parts of spectrum
getmax          finds the max value in parts of the spectrum
flmod           performs floating point mod function
alias_sup       performs alias suppression HISTORY:
Date            Author               Reason for Change
                L. Superina
5/26/89         L. Superina          input array float
6/12/89         L. Superina          modify algorithm (based on Barnes)
10/18/89        L. Superina          speed up
2/14/90         L. Superina          multiple alias sup.
*******************************************************************/

/********** ALIAS SUPRESSION INITIALIZATION (do in calling procedure)
    alias_vel = (1540 * prf)/(2 * fc);
    vel_scale = (float) fabs((double)(v1 - v2))/Nv;
    alias_dist = round(alias_vel/vel_scale);
    where:
        v1 - lower velocity limit
        v2 - upper velocity limit
        Nv - number of radial projections
        prf - pulse repetition frequency
        fc - center frequency
**********/

/************************************************************ moment ****/
void moment(int_ptr,start,end,length,f)
float *int_ptr;
int start,end,length;
float *f;
{   float m= 0,n= 0,d= 0,x = 0;
    register float value,num,*i_ptr;
    register int i,end1,end2 = 0,start1,total;

/*** calculate start and end points */
        start1 = start;
```

```
        end1 = (start1 + end) % length;
        if (end1 <= start1)
        {   end2 = end1;
            end1 = length;
        }

/*** calculate mean and variance  */
        i_ptr = int_ptr + start1;
        total = end1 - start1;
        for (i = 0;i++ < total;)
        { value = *i_ptr++;
          num = x * value;
          m += num;
          n += x * num;
          d += value;
          x += 1;
        }
        if (end2)
        {   i_ptr = int_ptr;
            total = end2;
            for (i = 0;i++ < total;)
            { value = *i_ptr++;
              num = x * value;
              m += num;
              n += x * num;
              d += value;
              x += 1;
            }
        }

/*** check for case where all values were zero */
        if (d != 0)
        {   num = m/d;
            *f++ = round(num + start) % length;  /* f[0] = mean */
            *f++ = n/d - (num * num);            /* f[1] = variance */
            *f = d;                              /* f[2] = zeroth moment */
        }
        else
            *f = -1;
        return;
}

/******************************************************* getmean ****/
void getmean(int_ptr,start,end,length,f)
float *int_ptr;
int start,end,length;
int *f;
{   float m= 0,n= 0,d= 0,x = 0;
    register float value,num,*i_ptr;
    register int i,end1,end2 = 0,start1,total;

/*** calculate start and end points */
        start1 = start;
        end1 = (start1 + end) % length;
        if (end1 <= start1)
        {   end2 = end1;
            end1 = length;
        }

/*** calculate mean   */
        i_ptr = int_ptr + start1;
        total = end1 - start1;
        for (i = 0;i++ < total;)
        { value = *i_ptr++;
          m += x * value;
          d += value;
          x += 1;
        }
```

```
        if (end2)
        {   i_ptr = int_ptr;
            total = end2;
            for (i = 0;i++ < total;)
            {   value = *i_ptr++;
                m += x * value;
                d += value;
                x += 1;
            }
        }

/*** check for case where all values were zero */
        if (!d)
            *f = 0;
        else
        {   num = m/d;
            *f = round(num + start) % length;
        } return;
}

/************************************************************ getmax ****/
float getmax(int_ptr,start,end,length)
float *int_ptr;
int start,end,length;
{   register int i,end1,start1,total;
    register float temp,maxval,*i_ptr;
    int end2 = 0;

/*** calculate start and end points relative to circular buffer */
        start1 = start;
        end1 = (start1 + end) % length;
        if (end1 <= start1)
        {   end2 = end1;
            end1 = length;
        }

/*** find max value position   */
        maxval = 0.0;
        i_ptr = int_ptr + start1;
        total = end1 - start1;
        for (i = 0;i++ < total;)
        {   temp = *i_ptr++;
            if (temp > maxval)
                maxval = temp;
        } if (end2)
        {   i_ptr = int_ptr;
            total = end2;
            for (i = 0;i++ < total;)
            {   temp = *i_ptr++;
                if (temp > maxval)
                    maxval = temp;
            }
        }
        return(maxval);
}

/************************************************************ flmod ****/
float flmod(float x,int y)
{
    float temp;
    double n,f;

f = modf(x,&n);
```

```c
    temp = ((int) n % y) + ((x < 0)? (y + f):f);

return(temp);
}

/*********************************************************** alias_sup **/
void alias_sup(radpro,Nv,alias_dist,num_alias,meanrep,beta,fp)
float *radpro;
int Nv,alias_dist,num_alias;
int meanrep,beta;
FILE *fp;
{
    float fl_ptr[3],*radpro_ptr,temp,fmin,maxmax = 0.0;
    int i,j,end,gmean,total;
    static float *max,*mom_0,*stddev,*f;
    static int *mean,*start,pr_out = 120;

/*** Allocate buffers for spectrum parameters */
    if (!mean) {
        mean = (int *)malloc(10 * sizeof(int));
        start = (int *)malloc(10 * sizeof(int));
        stddev = (float *)malloc(10 * sizeof(float));
        f = (float *)malloc(10 * sizeof(float));
        mom_0 = (float *)malloc(10 * sizeof(float));
        max = (float *)malloc(10 * sizeof(float));
    }

/*** 1 - find the convergent mean of the spectrum */
        start[0] = 0;
        getmean(radpro,start[0],Nv,Nv,&gmean);
        if ((gmean <= Nv/2 + 2) && (gmean >= Nv/2 - 1))
            gmean += 10;
        start[0] = mod((gmean + Nv/2),Nv);
        for (i = 0;i++ < meanrep;)
        {   getmean(radpro,start[0],Nv,Nv,&gmean);
            start[0] = mod((gmean + Nv/2),Nv);
        }

/*** Set starting points of alias spectra starting at gmean */
        for (j = 1;j < num_alias + 1;j++)
            start[j] = mod((start[0] + j * Nv/(num_alias + 1)),Nv);

/*** 2 - Find local max of each spectrum and normalize */ for ( j = 0;j < num_alias + 1;j++)
        {   max[j] = getmax(radpro,start[j],Nv/(num_alias + 1),Nv);
            if (max[j] > maxmax)
                maxmax = max[j];
        } if (maxmax == 0.0) maxmax = 1.0;
        for (j = 0;j < num_alias + 1;j++)
            max[j] = max[j]/maxmax;

/*** 3 - find the mean and variance of each spectrum */ for (j = 0;j < num_alias + 1;j++)
    {
        moment(radpro,start[j],Nv/(num_alias + 1),Nv,fl_ptr);
        if (fl_ptr[0] >= 0)
        {   mean[j] = round(fl_ptr[0]);
            stddev[j] = fl_ptr[1];
            mom_0[j] = fl_ptr[2];
        }
        else
        {   mean[j] = start[j];
            stddev[j] = 10000;
```

```
            mom_0[j] = 0;
        }
    }

/*** 4 - Based on max and variance, suppress the aliased data */
    for (j = 0;j < num_alias + 1;j++)
        f[j] = stddev[j] + (beta * (1.0 - max[j]));

fmin = f[0];
    start[0] = (start[0] + Nv/(num_alias + 1)) % Nv ;
    for (j = 1;j < (num_alias + 1);j++)
    {   if (fmin > f[j])
        {   start[0] = (start[j] + Nv/(num_alias + 1)) % Nv ;
            fmin = f[j];
        }
    } if (fp)
        fprintf(fp,"\n%2d",start[0]);

end = (start[0] + num_alias * Nv/(num_alias + 1)) % Nv;
        if (end <= start[0])
            total = Nv - start[0];
        else total = end - start[0];
        radpro_ptr = radpro + start[0];
        for (j = 0;j++ < total;)
            *radpro_ptr++ = 0;
        if (end <= start[0])
        {   radpro_ptr = radpro;
            total = end;
            for (j = 0;j++ < total;)
                *radpro_ptr++ = 0;
        }
    return;
}
```

We claim:

1. A method for suppressing alias terms from the output of a system which processes pulsed wave signals to determine a velocity spectrum of a target, wherein samples of the pulsed wave signals are processed using a two-dimensional transform which maps spectral components attributable to a constant velocity Doppler shift into radial lines and a radial projection of the transformed signal is taken to extract a velocity spectrum, comprising the steps of:

identifying data samples of the velocity spectrum which represent individual spectral terms by locating a mean data sample which evenly divides the spectral terms, evenly distributing spectral windows around said means data sample, and grouping spectral data samples within each window;

within each window calculating the maximum value and the width of each spectral data term;

selecting as a true velocity spectrum term, the group of data samples within a window which maximizes a function which is maximized by a large maximum value and a small width; and suppressing all data samples which are not in the selected true velocity spectrum term.

2. The method of claim 1 wherein the step of locating the means data sample which evenly divides the spectral terms comprises the steps of:

first computing a means, starting at a first data sample of the velocity spectrum and then, if the previously computed mean is not at the center of the velocity spectrum, iteratively rotating the spectrum so that the previously computed means is at the center of the spectrum and then recomputing the mean of the rotated spectrum until the recomputed mean is at the center of the rotated spectrum.

3. The method of claim 2 wherein the pulsed wave signals are derived from ultrasound pulses.

4. The method of claim 1 wherein the pulsed wave signals are derived from ultrasound pulses.

5. The method of claim 1 where in the transform is a two-dimensional Fourier transform.

6. The method of claim 1 wherein the function is $$score = variance + \beta(maxmax - max)$$

where max is the maximum data sample value within the window, maxmax is the maximum data sample within the entire velocity spectrum, and $\beta$ is a weighting factor.

7. Apparatus for processing pulsed wave signals to determine a velocity of a target comprising:

means which process samples of the pulsed wave signals using a two-dimensional transform which maps spectral components attributable to a constant velocity Doppler shift into radial lines;

means which take a radial projection of the transformed signal to extract a velocity spectrum therefrom;

means which identify data samples of the velocity spectrum which represent individual spectral terms by locating a mean data sample which evenly divides the spectral terms, evenly distributing spectral windows around said data samples, and grouping data samples within each window;

means which, within each window, calculate the maximum value and width of the group of data terms;

means which select as a true velocity spectrum term, the group of data samples within a window which maximizes a function which is maximized by a large maximum value and a small width; and means which process all data samples which are not in the selected true velocity term.

8. The apparatus of claim 7 wherein the means which locate the mean data sample which evenly divides the spectral terms comprise:

means for computing a mean, starting at a first data sample of the velocity spectrum, and means which determine if the previously computed means is not at the center of the velocity spectrum and, if so, iteratively rotate the spectrum so that the previously computed mean is at the center of the spectrum and recompute the mean of the rotated spectrum until the recomputed means is at the center of the rotated spectrum.

9. The apparatus of claim 8 further comprising echo ultrasound scanner means for producing the pulsed wave signals.

10. The apparatus of claim 7 further comprising echo ultrasound scanner means for producing the pulsed wave signals.

* * * * *